United States Patent [19]
McGhie

[11] 3,840,349
[45] Oct. 8, 1974

[54] APPARATUS FOR FRACTIONAL SUBLIMATION USING A ROTATING HELICAL HEAT SOURCE

[75] Inventor: Andrew R. McGhie, Wilmington, Del.

[73] Assignee: E. I. du Pont de Nemours and Company, Wilmington, Del.

[22] Filed: Aug. 26, 1971

[21] Appl. No.: 175,280

[52] U.S. Cl. ............... 23/273 F, 23/264, 23/294, 165/86, 219/385
[51] Int. Cl. ............................................. B01d 7/00
[58] Field of Search ........... 23/294, 273 F, 273 SP, 23/301 SP, 264; 260/706; 165/86, 89, 90, 184; 202/238; 159/6 W, 6 R, DIG. 1, DIG. 26; 219/56, 385

[56] References Cited
UNITED STATES PATENTS

| | | | |
|---|---|---|---|
| 2,547,085 | 4/1951 | McDermott | 165/89 |
| 2,617,273 | 11/1952 | Findlay | 23/273 F |
| 2,628,892 | 2/1953 | Reid | 165/86 |
| 3,163,587 | 12/1964 | Champe | 159/6 R |
| 3,250,687 | 5/1966 | Frank | 202/238 |
| 3,266,555 | 8/1966 | Thier | 159/6 W |
| 3,429,904 | 2/1969 | Eisentraut et al. | 23/294 |
| 3,551,115 | 12/1970 | Jamieson et al. | 23/273 |
| 3,591,346 | 7/1971 | Kluckow et al. | 23/294 |
| 3,690,372 | 9/1972 | Niebisch | 165/86 |

Primary Examiner—Norman Yudkoff
Assistant Examiner—R. T. Foster

[57] ABSTRACT

Described are forms of a rotatable sublimation apparatus for separating or purifying chemicals. A tubular member containing a sample to be sublimed is heated by a heating coil helically wound on another tube. The tubes are coaxial, either within the other, and they rotate relatively, generally one rotatable and the other stationary. Also disclosed are several chemical separations by sublimation using the apparatus, e.g., the purification of tetracene and 2-chloroanthracene and the separation of chrysene and 2,3-benzocarbazole.

8 Claims, 3 Drawing Figures

PATENTED OCT 8 1974 3,840,349

INVENTOR
ANDREW R. MC GHIE

BY *James H. Ryan*

ATTORNEY

APPARATUS FOR FRACTIONAL SUBLIMATION USING A ROTATING HELICAL HEAT SOURCE

BACKGROUND OF THE INVENTION

1. Field of the Invention

This invention relates to an apparatus for the fractional sublimation of mixtures and to its use for the preparation of sublimable materials of improved purity, for the analytical separation and isolation of sublimable components of a mixture, and for the preparation of crystals in desired habits or morphologies.

Objects of the invention include providing an apparatus useful on a commercial scale for the purification of chemical compositions. A further object is to provide an apparatus for use in conjunction with a suitable detector for the analytical estimation of the components of a sublimable mixture. Among the other objects of the invention are to provide fractional sublimation methods for the prepration of (a) optical materials of uniform spectroscopic quality, (b) polymer intermediates with reduced content of chain-stopping and cross-linking impurities, and (c) vapor grown crystals of perfected habit.

2. Prior Art

Sublimation techniques have not been widely practiced for the separation of mixtures, except in the few cases where one component has grossly different vapor pressure from other components of a mixture. The paucity of commercial sublimation techniques is believed to result from the practical problem of providing adequate opportunity for repeated solid-vapor equilibration. Thus, no practical counterparts are known in solid-vapor systems for the extensive fractional distillation technology developed for liquid-vapor equilibria. In further contrast, solid-liquid equilibria are the subject of extensive technology dealing with fractional crystallization and in particular with zone melting techniques (see, for example, W. G. Pfann, "Zone Melting," 2nd Ed., John Wiley & Sons, Inc., New York, 1965; see, also, Pfann U.S. Pat. No. 3,423,189).

Attempts have been made to adapt zone refining methods to solid-vapor equilibria (see the cited Pfann book, pp. 65–66), but the apparatus has up to now been complicated and inefficient for obtaining good separation of components. Improved sublimation separations have also been sought by exposing a sublimable mixture to a uniform temperature gradient in the containing vessel so that ideally each component would tend to accumulate in that region of temperature in which its vapor pressure becomes negligible. Such a method [see, for example, W. H. Melhuish, Nature, 184, 1933 (1959)] has offered improved separations compared to a single stage operation utilizing a fixed temperature at the pot and at the condenser surface. However, this technique is still relatively inefficient and does not provide the repeated equilibria between the condensed and vapor phases typical, for example, with fractional distillation. Unlike the latter, the sublimed components are usually obtained in a continuous gradation of concentration rather than as discrete portions of individual components.

SUMMARY OF THE INVENTION

The sublimation apparatus of the present invention comprises an elongated internal chamber having means for introducing sublimable material at one end and means for collecting the sublimate toward the other end, a helical heating element coaxially disposed adjacent the walls of said chamber, means for providing relative rotation between said chamber and said heating element whereby cyclical temperature gradients are advanced along the walls of said chamber toward the collecting end thereof, and, optionally, means for providing reduced pressure and controlled flow of gas within said chamber.

DRAWINGS AND DETAILS OF THE INVENTION

In the schematic drawings (wherein the same numerals represent the same items):

Figure 1:
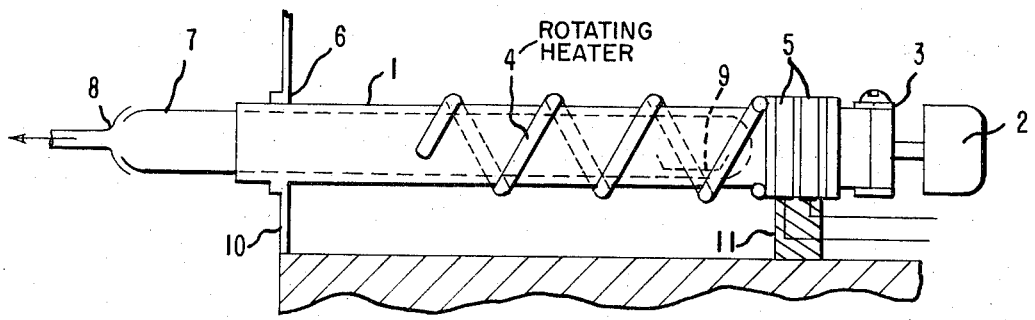
FIG. 1 is an embodiment of a rotatable sublimation apparatus holding one form of sample tube.

In more detail, FIG. 1 represents an embodiment of a rotatable sublimation apparatus wherein 1 is a heat-resistant tube rotatable by a motor 2, through a chuck 3, said tube being wrapped with a bifilarly wound heating wire, 4, connected to current leads by means of slip rings 5. The heating tube is rotatably supported by bearings 6 and is adapted to receive in close proximity to its interior walls, a nonrotating sublimation or sample tube 7, with a closure 8, which can be connected to a source of vacuum (indicated by the arrow). A boat 9 can be used in tube 7 to hold a sample. Supports 10 and 11 hold the rotatable tube 1.

Figure 2:
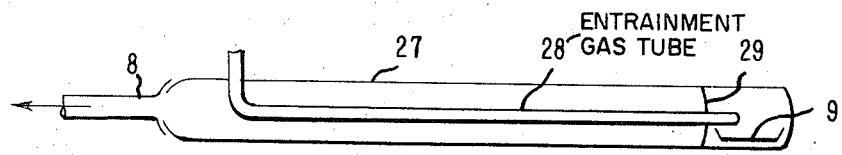
FIG. 2 is a second form of a sample tube capable directly of substitution for that shown in FIG. 1.

FIG. 2 illustrates an alternate sublimation tube 27 containing a central tube 28 to supply an entrainment gas, a sample boat 9, and a removable baffle, 29. Sublimation tube 27 can be bodily substituted for sublimation tube 7 in FIG. 1.

Figure 3:
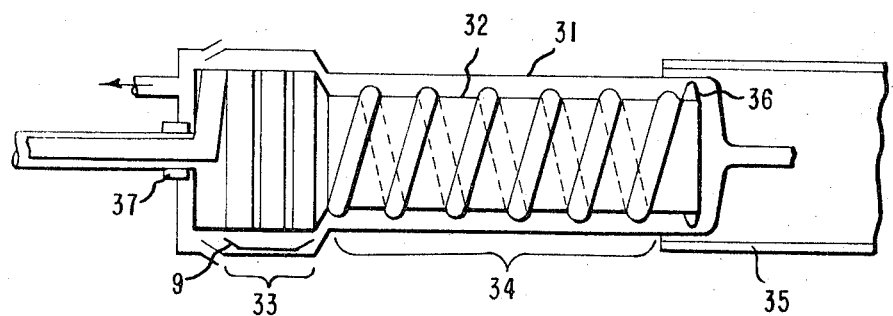
FIG. 3 is a second embodiment of the rotatable sublimation apparatus.

FIG. 3 illustrates an embodiment of a rotating sublimation apparatus in which sublimation takes place in the annular space between an outer stationary sample tube 31 and an interior rotating tube 32, wrapped with a heating wire which provides a uniform preheating section 33 as well as a helically wound section, 34. Optionally, an after-heater in the form of a heated sleeve 35 may be progressively moved by suitable means from the exit and toward the entrance end of the sublimation chamber to transport successive portions of sublimate to the region of a detecting element. Support 36 can maintain centering and alignment of inner tube 32 and can consist of a pair of lugs in close contact with the inner wall of outer tube 31. Bushing 37 provides proper alignment at the outer end of the two tubes.

The rotating sublimation apparatus of the invention requires only relative rotation between the helical heater and the subliming chamber; either the chamber or the heating element may be rotated although it is generally more convenient to have the chamber stationary if it is connected in line with pumping or detecting elements of a sublimation process. Configurations in which both the heater and the subliming chamber rotate are, of course, possible.

It is frequently convenient to conform the heating element to the outside surface of a rotating support tube which separates the heating coils from an interior sublimation chamber. It is also useful, however, to situate the chamber as a cylindrical annulus around the heating element. Where no electrical or corrosion problems interfere, the helical heater may be disposed directly within the sublimation chamber as shown in FIG. 3. The walls of the sublimation chamber should have low thermal conductivity in order to insure a sharp thermal gradient; glass or quartz are preferred. It is further preferred to provide a disposable liner within which sublimation occurs so that the sublimate collecting in discrete portions of the sublimation chamber may be readily collected if desired, and contamination of subsequent samples can be easily prevented. Tubes or films of polymers resistant to high temperature, such as the commercially available polyimide materials, are suitable.

The unheated portion of the chamber walls between helical coils may be air-cooled or it may be cooled by liquid. A convenient form of liquid cooling is to interleave the spiral heating coils with a spiral coil of absorptive material such as a sponge element provided with a supply of cooling water.

Good and repeated contact of the subliming vapor with a condensing surface being essential to the operation of the apparatus, the sublimation chamber may be packed with an inert material such as glass beads to prevent streaming of the supercooled sublimed vapor. Packing is particularly useful when sublimation is carried out at high vacuum where the mean free path of the subliming vapor may exceed the distance between consecutive condensing surfaces (e.g., the pitch of the heating coil).

It is advantageous to have the pitch of the heating coil comparable in size or larger than the effective thickness of the subliming chamber. Thus, for example, the helical pitch should not be substantially smaller than the radius of an open cylindrical chamber. While the number of helical coils in the subliming apparatus is not critical, at least several cycles and preferably at least five cycles should be maintained along the length of the sublimation chamber. The rate of rotation may be varied widely depending upon the relative vapor pressures of the subliming components. Rotations ranging from about one revolution per day to about one revolution per minute can be employed, slower rotation being used with greater helical pitch.

It is contemplated that a detector may be employed in conjunction with a final heater to indicate the nature and amount of material passing out of the fractionating zone. It is further contemplated that the heating element may be programmed to produce a preselected increase with time in the maximum heating temperature. It is also contemplated to superimpose a thermal gradient along the direction of the cyclical gradient either by appropriate variations in the pitch of the heating helix or by an additional heating element.

While the normal mode of operation is intended to be a horizontal sublimation direction, a vertical disposition may be used if care is taken to prevent an overwhelming effect of gravity on the thermal distribution or the mechanical distribution of the solids.

The apparatus and processes applicable to the invention are illustrated in the following nonlimiting examples.

EXAMPLE 1

Sublimation of Tetracene and 2-Chloroanthracene

A. A rotating sublimation apparatus was constructed essentially as depicted in FIG. 1, using an outer glass tube with outside diameter of 27 mm and a length of 3 feet. The tube was rotatably connected at one end by a chuck to a one-fourth RPH (revolutions per hour) motor and supported at the other end in a bearing surface of poly(tetrafluoroethylene). A bifilarly wound heating element was wrapped around the outside of the tube in helical fashion with a regular pitch of about two inches per revolution terminating at one end in a pair of slip rings through which current could be supplied from a variable voltage source of electricity. Another glass tube, 22 mm O.D., 2½ ft. long, and closed at one end with the configuration shown in FIG. 2 was connected to a vacuum pump and extended from its fixed mounting into the heating tube. This interior tube could receive a sample boat and was provided with a cylindrical nylon tube as an interior liner, and an axially arranged tube of 6 mm O.D. to introduce an entrainment gas (nitrogen) through a controlled leak. A baffle of glass fabric coated with poly(tetrafluoroethylene) was provided to prevent the inadvertent entrainment of the solid sample.

A sample of about 1 g of commercial grade of tetracene (containing about 5 percent impurities) was placed in a sample boat at the closed end of the sample tube situated at the hotter end of the heating tube near the slip rings. The pump and leak rate were adjusted to maintain 0.7 torr of nitrogen, and the heating tube was caused to rotate so that heated zones advanced helically from the closed end of the sample tube toward its open end. When the heater voltage was maintained at 55 volts, a good spiral distribution of crystals was obtained along the sample tube. A very sharp separation was observed at the cold end of the tube. The yellow needles deposited at the cold end were found to have a melting point of 198°C. This was later identified as essentially pure 2,3-benzofluorene which had been present as an impurity in the commercial tetracene.

B. In a similar manner, the apparatus of A was used to purify 2-chloroanthracene so that its fluorescence spectrum was free of peaks attributable to fluorescent impurities having both higher and lower volatilities.

EXAMPLE 2

Separation of Chrysene and 2,3-Benzocarbazole

A synthetic mixture of chrysene:2,3-benzocarbazole in the weight ratio 76:24 was used to compare the separation efficiency of the rotating sublimation apparatus with a conventional gradient sublimation apparatus. In each case, 1 g of this mixture was introduced near the closed end of a sample tube lined with a polyimide film and maintained at a pressure of $5 \times 10^{-3}$ torr by a vacuum pump. In one case, the sample tube was inserted into a helical heater as shown in FIG. 1 rotating at the rate of 2 RPH with a heater voltage of 55 volts. The other sample tube was inserted into a similar but nonrotating heating tube wrapped with a similar heating element in the form of a helix of increasing pitch. A voltage of 60 volts was used to maintain the maximum temperature at the hottest end at about 200°C. Each run lasted 2 hours. After cooling the sample tubes, the inner polyimide liners were removed and compared. The gradient-heated tube contained a single, almost continuous region of sublimate in the middle third of the tube, whereas the tube subjected to the helically rotating heater showed three discrete zones of sublimate, well separated along the length of the tube. The liners were then sectioned and the sublimate in each section was weighed and analyzed by its ultraviolet absorption spectrum. The results shown in Table I clearly show the superior separation obtained with the helically rotating sublimation apparatus.

TABLE I

| Gradient Sublimation | | Approx. Location | Rotating Sublimation | |
|---|---|---|---|---|
| BZC Content* % | % of Total Weight | cm From Origin | % of Total Weight | BZC Content % |
| — | None | 0–10 | None | — |
| 1.4 | Trace | 10–15 | 74 | 4.6 |
| 2.5 | 4 | 15–18 | None | — |
| 5.5 | 12 | 18–21 | None | — |
| 9.1 | 28 | 21–24 | None | — |
| 36.0 | 33 | 24–27 | None | — |
| 48.0 | 23 | 27–30 | 4 | — |
| — | None | 30–33 | None | — |
| — | None | 33–39 | 20 | 88.0 |
| — | None | 39–45 | None | — |

*BZC = benzocarbazole; initial content in mixture 24%.

EXAMPLE 3

Sublimation of 1,5-Diaminoanthraquinone

In order to identify impurities in a crude sample of 1,5-diaminoanthraquinone, it was fractionally sublimed through a packed bed in a rotating sublimation apparatus. A short length of 12 mm test tube loosely plugged with glass wool served as a sample boat. This was inserted in the closed end of a 16 mm O.D., 70-cm long sublimation tube, to which was added for a portion 10 cm long a layer of small glass beads (weight 23 g; packing factor 0.59). The sublimation tube was inserted in a 20-mm O.D. quartz heating tube wrapped with a bifilarly wound nichrome ribbon (15 ohms) having 10 helical turns at 5-cm intervals followed by three turns at 10 cm. The heating tube was rotated (using slip rings) at 2 RPH while being heated with 45 volts ($T_{max} \approx$ 300°C) and then at 50 volts ($T_{max} \approx$ 350°C).

After several hours heating at $10^{-3}$ torr, the sublimation tube contained a zone (No. 1) of sublimate well beyond the packed portion, another zone (No. 2) of sublimate within the packed region, a distinct zone (No. 3) in the glass wool region and an unsublimed fluffy residue (No. 4) that had not been transported. The distinct zones of material were readily separated and could be characterized by solution color and liquid chromatographic behavior as shown in Table II. The chromatographic peaks were identified by their mass spectra and ultraviolet spectra as follows: The peak at 5.1 minutes was triaminoanthraquinone; the peak at 5.4 minutes was unidentified; the peak at 7.2 minutes was 1,5-diaminoanthraquinone; the peak at 10.2 minutes was 1-aminoanthraquinone; the peak at 14.8 minutes was anthraquinone.

1,5-Diaminoanthraquinone, purified from more volatile, and less volatile impurities by use of the helical sublimation apparatus of this invention shows a better response to polymerization than does the unpurified material.

EXAMPLE 4

Sublimation of Terephthalic Acid

The apparatus used was that described for Example 3, except that the starting material, 7.0 g of a commercial grade of terephthalic acid, was charged directly into the 16-mm diameter sublimation tube to a depth of 5 cm (of the 70-cm tube). No sample boat or glass bead packing was used.

The tube was evacuated to $2 \times 10^{-3}$ torr, then heated at 45 volts ($T_{max} \approx$ 300°C) for 12 hours while the heating tube was rotated at 2 RPH. After cooling, the sublimed material was separated into portions defined by their distance (cm) from the closed end of the 70 cm tube. The portions were analyzed for paratoluic acid (PTA, originally present at 510 ppm) and for paraformylbenzoic acid (PFBA, originally present at 1,460 ppm).

The results shown below illustrate the removal of the major portion of these impurities from terephthalic acid:

| Zone | Distance from End (cm) | Appearance | % PTA | % PFBA |
|---|---|---|---|---|
| 1 | 0–5 | Brown residue | — | — |
| 2 | 5–12 | Heavy, pale-yellow sublimate; ~5 g | Trace | 203 |
| 3 | 12–37 | White helical deposit Blue-white fluorescence | Trace | 2310 |
| 4 | 37–56 | Almost no deposit | — | — |
| 5 | 56 | Fluorescent band | — | — |
| 6 | 56–70 | White deposit; not fluorescent | 7000 | 40,000 |

EXAMPLE 5

Sublimation of Tetracene

A sample of 0.4 g of pure (99.98 percent) tetracene was charged into an 18 mm O.D. test tube which was then plugged with glass wool and inserted into a long, open-ended, 25-mm O.D. glass tube which extended on each end through a shorter length of 30 mm O.D. helically wrapped, rotatable quartz heating tube. One end of the 25 mm tube was connected to a pump via a pressure regulator while the other end was connected to a source of nitrogen gas. The tube was evacuated and the pressure adjusted to 0.85 torr. With the heater rotating at 0.5 RPH, only very slight sublimation occurred over

TABLE II

Impurities in DAAQ*

| Zone | Color of Isopropanol Solution | Color of H$_2$SO$_4$ Solution | Peak Height at Various Retention Times In Minutes | | | | |
|---|---|---|---|---|---|---|---|
| | | | 5.1 | 5.4 | 7.2 | 10.2 | 14.8 |
| 1 | Orange | Orange | — | — | — | 153 | 61 |
| 2 | Pink | Yellow | 160 | — | 15 | — | — |
| 3 | Violet | Nil | 170 | — | — | — | — |
| 4 | Nil | Green | — | 7 | — | — | — |

*Crude 1,5-diaminoanthraquinone.

a period of 48 hours while the heating voltage was increased from 15 to 26 volts. Well-formed crystals of tetracene over 1 mm in size were obtained as the heating voltage was then increased from 26 to 30 volts.

This example illustrates how the rotating sublimation apparatus can be used with careful control of temperature to provide crystal growth with periodic partial evaporation from crystal surfaces during growth from the vapor for substances whose thermal stability is insufficient for the preparation of pure crystals by melt techniques.

In a similar manner, the rotating sublimation apparatus may be utilized to prepare particles of very uniform crystal habit by preferential sublimation from those facets having higher surface energies.

Since obvious modifications and equivalents will be evident to those skilled in the chemical arts, I propose to be bound solely by the appended claims.

The embodiments of the invention in which an exclusive property or privilege is claimed are defined as follows:

1. Sublimation apparatus comprising,
   as a first element, a hollow cylindrical tube for containing a solid to be sublimed having means for introducing a sublimable material in solid form near one end thereof and means for withdrawing the sublimed material axially along said tube toward the other end thereof, and,
   as a second element, a helical heating coil coaxial with the hollow cylinder and in proximity thereto but not in direct contact therewith to heat the same in a helical pattern, said helical heating coil having at least several cycles along the length of the hollow cylinder and having a helical pitch not substantially smaller than the radius of the hollow cylinder,
   said first and second elements being relatively rotatable, said helical heating coil and the relative rotation being such that cyclical temperature gradients are advanced along the walls of the hollow cylinder toward the end from which the sublimed material is withdrawn,
   means for rotating a rotatable member, and
   assembly means for holding the first and second elements and rotative means in operative position relative to each other.

2. The sublimation apparatus of claim 1 wherein the axis of the first and second elements is disposed horizontally.

3. The apparatus of claim 1 in which one of said first and second elements is fixed and the other, rotatable.

4. The apparatus of claim 3 wherein the heating coil is rotatable outside the cylindrical tube.

5. The apparatus of claim 4 wherein the cylindrical tube contains an inlet for a sweeping gas.

6. The apparatus of claim 3 wherein the heating coil is rotatable inside the cylindrical tube.

7. The apparatus of claim 6 wherein the heating coil contains a uniform preheating section.

8. The apparatus of claim 6 comprising additionally a movable after-heater around part of the sample tube.

* * * * *